United States Patent [19]

Rosaen et al.

[11] 4,372,855
[45] Feb. 8, 1983

[54] FILTER DEVICE WITH AIR BLEED

[76] Inventors: Borje O. Rosaen, 4031 Thornoaks Dr., Ann Arbor, Mich. 48104; Dale P. Fosdick, 7000 Austin Rd., Saline, Mich. 48176

[21] Appl. No.: 258,670

[22] Filed: Apr. 29, 1981

[51] Int. Cl.³ ............................................. B01D 29/10
[52] U.S. Cl. .................................... 210/316; 210/436; 210/452; 210/472
[58] Field of Search .............. 210/315, 316, 436, 452, 210/318, 323.1, 323.2, 342, 472

[56] References Cited

U.S. PATENT DOCUMENTS 1,082,024 12/1913 Held ...................................... 210/452
2,707,562 5/1955 Kasten .................................. 210/436
3,113,925 12/1963 Rosaen ................................. 210/436

*Primary Examiner*—Ivars C. Cintins
*Attorney, Agent, or Firm*—Gifford, Van Ophem, Sheridan and Sprinkle

[57] ABSTRACT

A fluid filtering device comprising a housing having an axis and defining an interior chamber. In one preferred embodiment a fluid inlet port is formed at one end of the housing which is open to the chamber while a fluid outlet port is formed on one side and is also open to the chamber. A filter element is positioned within the chamber between the inlet port and the outlet port. A first air bleed conduit within the housing has one end positioned within the outlet port and its other end positioned at the upper portion of the chamber when the housing is substantially vertically oriented. A second air bleed conduit within the housing also has one end within the outlet port and three openings at its other end. One of these three openings is at the uppermost portion of the chamber when the housing is in a corresponding one of three substantially horizontal positions. In a further form of the invention fluid passageways extend directly from a fluid outlet port formed at one end of the housing and one end of an annular inlet chamber surrounding the filter element.

9 Claims, 3 Drawing Figures

FILTER DEVICE WITH AIR BLEED

BACKGROUND OF THE INVENTION

I. Field of the Invention

The present invention relates generally to filtering devices and, more particularly, to a filtering device with air bleed means.

II. Description of the Prior Art

There are many types of previously known fluid filtering devices, for example, fluid filtering devices used in hydraulic fluid systems. These fluid filtering devices typically include a housing which defines an interior chamber. An inlet port and an outlet port are provided in the housing and a filter element is disposed within the housing between the inlet port and outlet port. Thus, fluid flowing from the inlet port to the outlet port passes through the filter element to remove contaminants from the fluid. In many types of filtering devices, the filter element is removable from the housing for cleaning and/or replacement with a clean filter element.

It is often desirable to eliminate the accumulation of air in pockets within the fluid system. For example, in a hydraulic system, a large air pocket can cause significant pump cavitation, and result in erosive pump damage and instability of operation of the hydraulic system.

A number of the previously known filtering devices have thus included some means to continuously bleed the air from the fluid in the system in order to prevent accumulation of air. The air is thus passed in small relatively harmless quantities to the fluid flow through the system. In the latter case, the small air bubbles within the fluid do not adversely affect the operation of the fluid system whereas a large air pocket would.

These previously known filtering devices with air bleed means, however, provide for only a very limited number of orientations for the device. The previously known filtering devices are thus disadvantageous in that operation in other desirable orientations is either ineffective or renders the air bleed means inoperable.

SUMMARY OF THE PRESENT INVENTION

The present invention overcomes the above mentioned disadvantages of the previously known filtering devices with air bleed means by providing such a filtering device which may be physically oriented either horizontally or vertically and still retain the air bleed function.

In brief, the fluid filtering device according to the present invention comprises an elongated and preferably cylindrical housing having a longitudinal axis and defining an interior chamber. A first fluid port is formed at one end of the housing and is open to the interior chamber. Similarly, a second fluid port open to the interior chamber is formed on one side of the housing and extends radially outwardly therefrom. In one form of the invention, the first port is the inlet port for the filtering device while the second port is the outlet port for the filtering device.

A preferably tubular and cylindrical filter element is insertable through an opening at the opposite end of the housing so that the filter element is positioned fluidly in between the fluid ports. In addition, the outer periphery of the filter element is spaced from the interior of the housing to form an annular outlet chamber open to the outlet port while the inlet port is directly open to the interior of the filter element.

A cover is removably attached to the end of the housing in order to close the opening after insertion of the filter element and to permit the removal of the filter element from the housing for cleaning and/or replacement. A bypass valve arrangement is also preferably mounted to the cover to permit fluid to flow from the interior of the filter element and to the annular outlet chamber when the pressure differential across the filter element exceeds a predetermined amount, indicative of excessive clogging of the filter element.

In a preferred form of the invention, a first air bleed conduit is positioned within the annular outlet chamber so that one end of the air bleed conduit is positioned closely adjacent the cover and thus adjacent the top of the housing chamber when the housing is so vertically oriented. The other end of the first air bleed conduit is positioned within the outlet port from the housing.

The present invention further comprises a second air bleed conduit having one end positioned within the outlet port. From the outlet port, the second air bleed conduit extends circumferentially around approximately three quarters of one end of the annular outlet chamber.

When the filtering device of the present invention is physically positioned within the fluid system so that its axis extends substantially vertically, with the lower uppermost air entrained within the fluid will rise toward the top of the housing to a position adjacent the cover. As more air entrained within the fluid flows into the housing, the air pocket at the upper end of the housing chamber will increase in size. These air bubbles, however, in the present invention will be continuously evacuated through the first air bleed conduit due to the venturi action of the fluid flowing through the outlet port. Thus, no air pocket is generated and only small air bubbles are fed to the effluent from the device.

The fluid filtering device of the present invention can also be physically arranged in four positions having its axis extending substantially horizontally. Three holes are placed at 90° increments so that one is at the uppermost portion of the housing annular outlet chamber in each of three positions. A fourth position, with the outlet port uppermost, requires no provision to avoid an accumulation. Venturi action draws small air bubbles, and liquid, simultaneously from three holes. Since air flows more readily than liquid it will be reliably evacuated.

The fluid filtering device of the present invention can also be applied physically so that its axis extends vertically the cover on the bottom and with the inlet uppermost. The circumferentially extending portion of the second air bleed circuit will provide three holes at the uppermost portion of the housing annular outlet chamber.

Thus, for this fluid flow direction, for all of these many desirable operating positions, when air entrained within the fluid accumulates at the upper end of the housing chamber, the air from the air pocket is continuously fed to the effluent from the filter device in the form of small bubbles through the second air bleed conduit.

In the event that the inlet and outlet ports are reversed, i.e., the port at the end of the housing forms the outlet port while the port extending from the side of the housing forms the inlet port, four opening ports are formed through the housing from the annular chamber and directly to the outlet port. In addition, a filter material is preferably positioned within the annular chamber around this opening to provide some filtering action for any fluid flow passing through this air bleed passage. Air accumulation prevention is then made for vertical application with the outlet port up, and for four positions in which the axis is horizontal.

BRIEF DESCRIPTION OF THE DRAWING

A better understanding of the present invention will be had upon reference to the following detailed description when read in conjunction with the accompanying drawings wherein like reference characters refer to like parts throughout the several views, and in which.

DETAILED DESCRIPTIONS OF PREFERRED EMBODIMENTS OF THE PRESENT INVENTION

Figure 1:
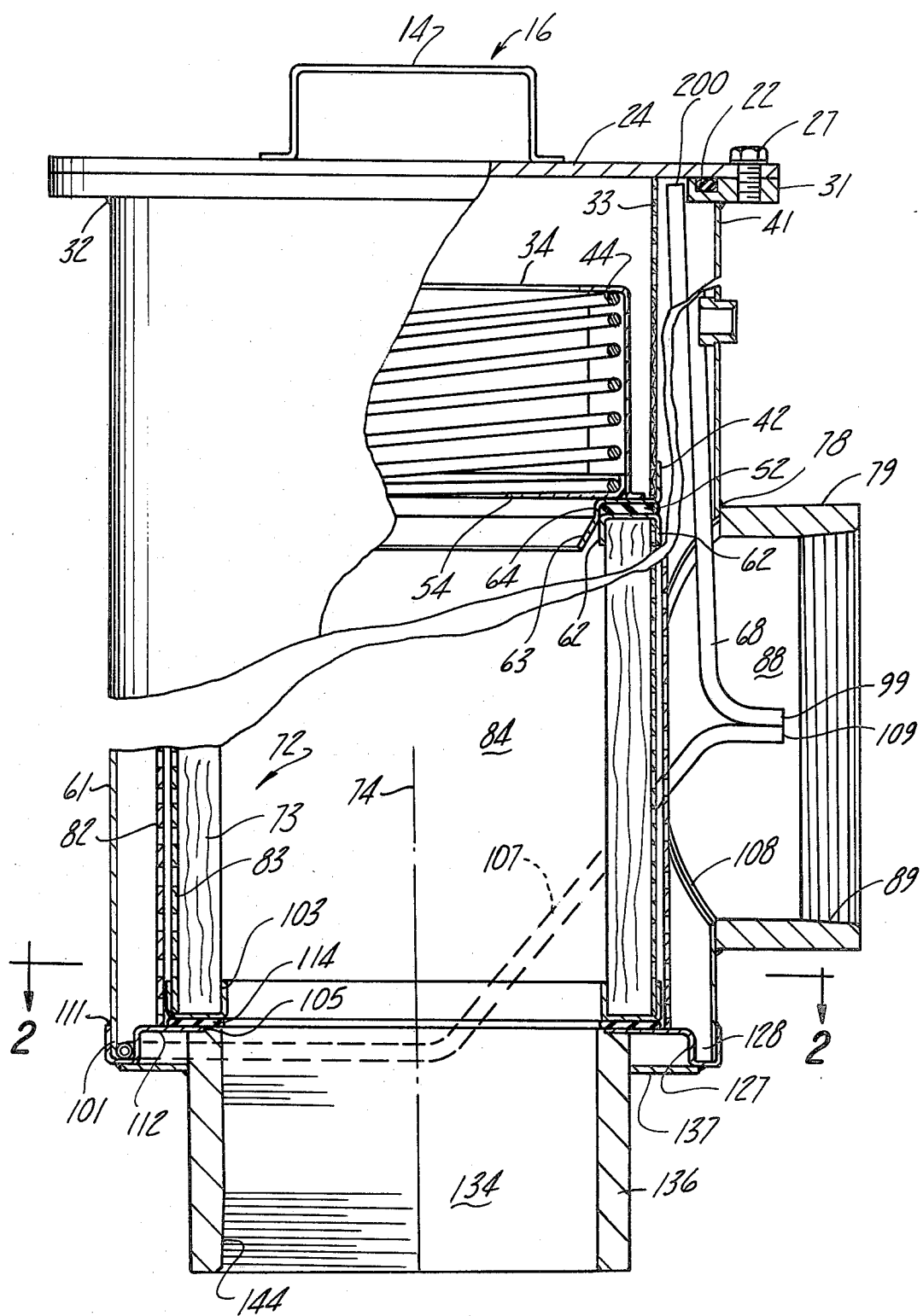
FIG. 1 is a longitudinal section illustrating a preferred embodiment of the filter device of the present invention.

With reference first to FIG. 1, a preferred embodiment of the filtering device of the present invention is thereshown and comprises a housing 61 having an elongated tubular and cylindrical body with a longitudinal axis 74. An annular and radially extending flange 31 is secured to the upper end 41 of the housing 61 as by welds 32. Similarly, an annular bottom plate 112, having a central opening 105, is attached by welds 111 to the lower end 101 of the housing 61. The lower plate 112 also includes an axially upwardly extending portion 127 which is spaced radially inwardly from the housing 61 thus forming a recess 128 therebetween.

A tubular and cylindrical fluid fitting 136 is coaxially attached to the opening 105 in the plate 112. The fluid fitting 136 is internally threaded at 144 for connection with a standard fluid connector (not shown). An annular plate 137 is also attached at its outer end to the lower end of the plate 112 and, at its inner end to the fitting 136 to add support to the fitting 136. The fluid fitting 136 thus forms a fluid port 134 which is open to an interior chamber 84 defined by the housing 61.

Still referring to FIG. 1, a tubular and cylindrical second fluid fitting 79 is attached by welds 78 to one side of the housing 61 and registers with an opening 108 formed through the housing 61. The second fitting 79 is internally threaded at 89 for attachment to a standard fluid connector and forms a fluid port 88 which is also open to the housing chamber 84 via the opening 108 in the housing 61.

The fluid filtering device according to the present invention further comprises a filter element assembly 72 which is insertable into the housing chamber 84. The filter assembly 72 comprises a tubular and cylindrical filter media 73 coaxial within a perforated shell 83 and terminating with ends 62 and 103 attached with adhesive. Gaskets 52 and 114 seal the ends of the filter element assembly 72.

Insertion of the filter element assembly 72 into the housing chamber 84 is facilitated by a perforated guide 82 which is welded to the plate 112. A gasket 22 is also positioned in a groove around the flange 31 at the upper end of the housing.

A cover assembly 16 comprises a perforated tube 33 welded to a circular cover 24 at one end of the tube 33 while a flanged circular plate 42 is welded to the opposite end of the tube 33. A relief valve 54 covers an opening 64 in the plate 42 and a spring 44 is held by a bracket 34 which in turn is welded to the plate 42. The spring 44 applies force against the valve 54 to hold it sealingly against and covering the opening 64.

The radially outer surface of the plate 42 at the opening 64 is slightly smaller in diameter than the inner diameters of the gasket 52 and the end cap 62 so as to define the location of the gasket 52 and one end of the filter element 72. The opening 64 in the plate 42 includes a conical extension 63 to guide its entry into the filter element 72. The cover assembly 16 also includes a handle 14 attached to the cover 24. Retaining screws 27 attach the cover assembly 16 to the housing 61.

When the filtering device is installed vertically with the cover assembly 16 on top as shown in FIG. 1, replacement of the filter element 72 is accomplished as follows: With the gasket 114 in place, the filtering element 72 is inserted with the guide tube 82. The gasket 52 is placed above filter element 72 and the cover assembly 16 is applied against the seal 22 and the gasket 52. The retaining screws 27 are then used to attach the cover 24 to the flange 31 and, upon tightening, exert a sealing force against the seal 22, the gasket 52 and the gasket 114 simultaneously.

An air bleed tube 68 is positioned within the housing 61 so that one end 200 of the tube 68 is positioned closely adjacent the cover 24. The opposite end 99 of the tube is positioned within the port 88.

When the filtering device is mounted vertically as shown in FIG. 1, fluid enters the port 134, and passes through the chamber 84, through the media 73 and into an annular chamber 71 formed between the filter element 72 and the housing 61 and finally out through the port 88. A venturi effect causes pressure to be reduced at the end 99 of the tube 68, so that air flow through the tube 68 purges air from the underside of the cover 24 thus preventing the accumulation of any significant amount of free gas from the system.

Figure 2:
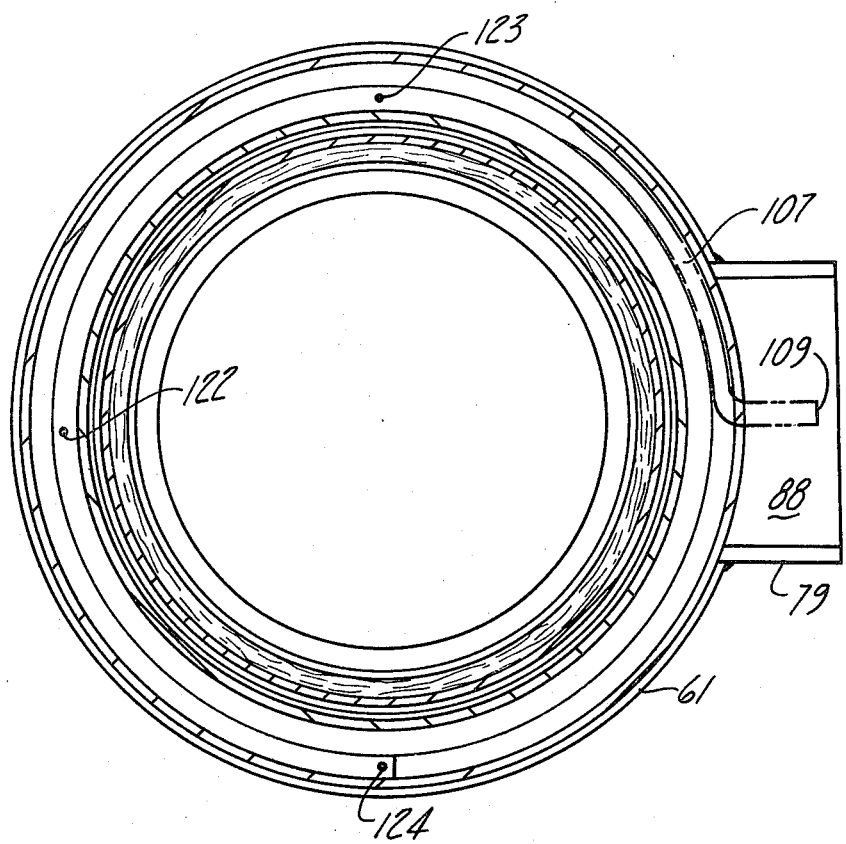
FIG. 2 is a sectional view taken substantially along line 2—2 in FIG. 1.

Referring now to FIGS. 1 and 2, a second tube 107 has an end 109 subject to venturi effect in the port 88 so that the pressure at the end 109 is always less than the pressure at any of the holes 122, 123 and 124 formed through the tube 107 and spaced 90° apart from each other. Installation of the filtering device in any of several positions in which its axis 74 is horizontal will result in one of the holes 122, 123 or 124 being substantially at the highest point within the chamber 71. This in turn will result in the continuous purging of any significant amount of free gas, as long as the housing is horizontal, from the port 134 and to the port 88.

Figure 3:
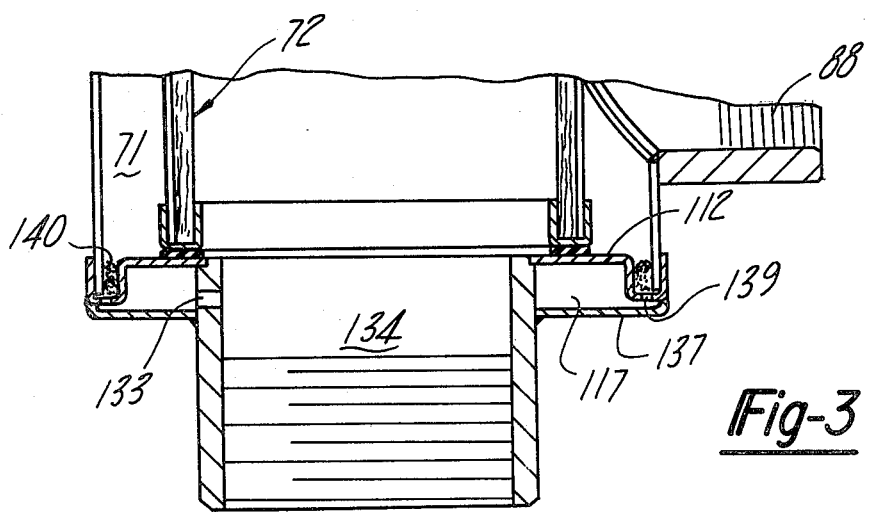
FIG. 3 is a fragmentary sectional view illustrating a further embodiment of the fluid filtering device of the present invention in which the fluid flow direction is opposite from that existing in FIGS. 1 and 2.

FIG. 3 illustrates an alternative construction when the fluid flow enters port 88 and exits through port 134. An opening 133 connects the port 134 to a chamber 117 formed between the plate 137 and the plate 112. Preferably at least four circumferentially spaced holes 139 are provided at the radially outermost part of chamber 117 through the plate 112 and a filtering media 140 is disposed within the recess 128. The holes 139 and 133 thus fluidly connect the annular chamber 71 to the outlet port 134. Fluid flow thus purges free gas from the filtering device for any desired horizontal operating position of the filtering device and also for vertical operation if the port 134 faces upwardly.

Having described my invention, however, many modifications thereto will become apparent to those skilled in the art to which it pertains without deviation from the spirit of the invention as defined by the scope of the appended claims.

I claim:

1. A fluid filtering device comprising:
    a housing having an axis, said housing defining an interior chamber,
    a fluid inlet port formed at one end of the housing and open to said chamber,
    a fluid outlet port formed on the side of the housing and open to said chamber,
    a filter element positioned within said chamber and fluidly between said fluid ports, said filter element dividing said interior chamber into an annular outlet chamber open to said outlet port and an inlet chamber open to said inlet port,
    first air bleed means for evacuating air from said chamber and to said outlet port when the axis of said housing is substantially vertically oriented,
    second air bleed means for evacuating air from said chamber and to said outlet port when the axis of said housing is substantially horizontally oriented, and
    wherein said first and second air bleed means respectively comprise a first and second tube, said tubes being open at at least one end, said tubes being positioned in said outlet chamber and wherein the open end of each tube is positioned within the outlet port so that the open ends of said tubes face outwardly from said outlet port.

2. The invention as defined in claim 1 wherein said filter element is tubular and axially disposed in said housing so that said first fluid port is open to the interior of the filter element.

3. The invention as defined in claim 2 wherein said housing is open at its other end and further comprising a cover detachably secured across the other end of said housing and wherein said filter element is removable from said housing through its open end.

4. The invention as defined in claim 1 wherein the other end of said first tube is positioned adjacent the uppermost end of the housing when said housing is vertically oriented.

5. The invention as defined in claim 4 wherein said first mentioned end of said tube is open adjacent one end of the housing.

6. The invention as defined in claim 1 wherein said second tube extends at least partly circumferentially around said outlet chamber at a position spaced outwardly from said filter element, said second tube having a plurality of circumferentially spaced openings formed through its circumferentially extending portion.

7. A fluid filtering device comprising:
    a housing having an axis, said housing defining an interior chamber,
    a fluid inlet port formed at one end of the housing and open to said chamber,
    a fluid outlet port formed on the side of the housing and open to said chamber,
    a filter element positioned within said chamber and fluidly between said fluid ports, said filter element dividing said interior chamber into an annular outlet chamber open to said outlet port and an inlet chamber open to said inlet port,
    air bleed means for evacuating air from said chamber and to said outlet port, said air bleed means comprising at least one tube having one end positioned within the outlet port and open to substantially the highest position of said housing chamber in a plurality of different orientations of the filtering device, and
    wherein said air bleed means comprises a tube positioned within said outlet chamber, said tube extending at least partly circumferentially around said outlet chamber at a position spaced outwardly from said filter element, said tube having one end positioned in said outlet port, and a plurality of circumferentially spaced openings formed through the circumferentially extending portion of said tube.

8. A fluid filtering device comprising:
    a housing having an axis, said housing defining an interior chamber,
    a fluid outlet port formed at one end of the housing and open to said chamber,
    a fluid inlet port formed on the side of the housing and open to said chamber,
    a filter element positioned within said chamber and fluidly between said fluid ports,
    said filter element being spaced radially inwardly from the housing thus defining an annular chamber open to the inlet port,
    air bleed means for evacuating air from said annular chamber and to said outlet port when the axis of said housing is substantially horizontally oriented, or when said housing is substantially vertically oriented with said outlet port extending upwardly from said housing, and
    wherein said air bleed means further comprises a plurality of circumferentially spaced restricted openings between said annular chamber and said outlet port.

9. The invention as defined in claim 8 and further comprising a filtering material disposed in said annular chamber adjacent said restricted opening.

* * * * *